United States Patent Office 3,210,245
Patented Oct. 5, 1965

3,210,245
METHOD OF COMBATING FUNGUS AND BACTERIAL INFECTION
Rudolf Merten, Cologne-Flittard, Paul-Ernst Frohberger, Burscheid, Dusseldorf, and Fritz Steinfatt, Opladen, Germany, assignors to Farbenfabriken Bayer Aktiengesellschaft, Leverkusen, Germany, a corporation of Germany
No Drawing. Filed June 20, 1961, Ser. No. 118,250
Claims priority, application Germany, June 22, 1960, F 31,477
13 Claims. (Cl. 167—30)

The present invention relates to and has as its objects new and useful fungicidal and bactericidal compositions and methods of combating plant-pathogens therewith as well as protecting plants, seeds and the locus of their growth with these active compounds. Generally, the compositions of this invention contain as active ingredients one or more of the following compounds:

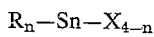

$$R_n-Sn-X_{4-n}$$

In this formula R is an organic radical, $n$ is an integer of 1, 2 or 3, X is an organic radical obtained by removing a terminal hydrogen atom from a basically substituted (by a tertiary nitrogen) phenol or oxime.

There are known already various organic tin compounds which are suitable for combating fungi or bacteria of various nature and on different objects or places.

Thus, German patent specification 1,079,329 describes reaction products of organically substituted tin halides, acylates and the like with alkylene oxides. The compounds described there—being of higher molecular nature—possess bactericidal as well as fungicidal properties. Also in German patent specification 1,061,561 there are mentioned tin compounds of aliphatic or aromatic hydroxy or aminocarboxylic acids for the destruction of fungi and bacteria.

The active compounds of this invention, as it has been found, effectively and broadly kill fungi or bacteria on various objects or places.

In the above mentioned formula more particularly the organic radical R may be any suitable organic radical. The term organic radical includes univalent aliphatic, cycloaliphatic, aromatic and heterocyclic radicals and substituted derivatives thereof. The organic radicals may be substituted with any substituent which does not interfere with the catalytic activity of the organo tin compound such as, for example, halogeno such as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals in the above formulae they may be, for example, alkyl, alkenyl, aralkyl and/or aralkenyl.

Any suitable alkyl radical may be the organic radical such as, for example, methyl, ethyl, n-propyl, isopropyl, n-butyl, isobutyl, secondary butyl, tertiary butyl, n-amyl and various isomers thereof such as, for example, 1-methyl-butyl, 2-methyl-butyl, 1,1-dimethylpropyl, 1,2-dimethylpropyl, 2,2, dimethylpropyl, 1-ethylpropyl and the like and the corresponding straight chain and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, ethenyl, 1-propenyl, 2-propenyl, isopropenyl, 1-butenyl, 2-butenyl, 3-butenyl and the corresponding branched chain isomers thereof such as, for example, 1-isobutenyl, 2-isobutenyl, 1-secondary-butenyl, 2-secondary-butenyl, including 1-methylene-2-propenyl, 1-pentenyl, 2-pentenyl, 3-pentenyl, 4-pentenyl and the corresponding branched chain isomers thereof; 1-hexenyl, 2-hexenyl, 3-hexenyl, 4-hexenyl, 5-hexenyl and the corresponding branched chain isomers thereof such as for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as, for example, benzyl, α-phenyl-ethyl, β-phenyl-ethyl, α-phenyl-propyl, β-phenyl-propyl, γ-phenyl-propyl, α-phenyl-isopropyl, β-phenyl-isopropyl, α-phenyl-butyl, β-phenyl-butyl, γ-phenyl-butyl, δ-phenyl-butyl, α-phenyl-isobutyl, β-phenyl-isobutyl, γ-phenyl-isobutyl, α-phenyl-secondary-butyl, β-phenyl-secondary-butyl, γ-phenyl-secondary-butyl, β-phenyl-tertiary-butyl, α'-naphthyl-methyl, β'-naphthyl-methyl and the corresponding α'- and β'-naphthyl derivatives of n-amyl and the various positional isomers thereof such as, for example, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, chrysene, pyrene, triphenylene, naphthacene and the like.

Any suitable aralkenyl radical may be the organic radical such as, for example, α-phenyl-ethenyl, β-phenyl-ethenyl, α-phenyl-1-propenyl, β-phenyl-1-propenyl, γ-phenyl-1-propenyl, α-phenyl-2-propenyl, β-phenyl-2-propenyl, γ-phenyl-2-propenyl, β-phenyl-isopropenyl and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononodecyl, cycloeicosyl, α-cyclopropyl-ethyl, β-cyclopropyl-ethyl, α-cyclobutyl-propyl, β-cyclobutyl-propyl, γ-cyclobutyl-propyl, α-cycloamyl-isopropyl, β-cycloamyl-isopropyl and the like.

Any suitable cycloalkenyl radical may be the organic radical such as, for example, α-cyclohexyl-ethenyl,
β-cyclohexyl-ethenyl,
α-cycloheptyl-1-propenyl,
β-cycloheptyl-1-propenyl,
γ-cycloheptyl-1-propenyl,
α-cyclooctyl-2-propenyl,
β-cyclooctyl-2-propenyl,
γ-cyclooctyl-2-propenyl,
β-cyclononylisopropenyl,
α-methylene-β-cyclododecyl-ethyl and the like.

Any suitable aryl radical may be the organic radical such as for example, phenyl, α-naphthyl, β-naphthyl, α-anthryl, β-anthryl, γ-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl,
m-tolyl,
p-tolyl,
2,3-xylyl,
2,4-xylyl,
2,5-xylyl,
2,6-xylyl,
3,4-xylyl,
3,5-xylyl,
o-cumenyl,
m-cumenyl,
p-cumenyl,
mesityl,
o-ethylphenyl,
m-ethylphenyl,
p-ethylphenyl,
2-methyl-α-naphthyl,
3-methyl-α-naphthyl,
4-methyl-α-naphthyl,
5-methyl-α-naphthyl,
6-methyl-α-naphthyl,
7-methyl-α-naphthyl,
8-methyl-α-naphthyl,
1-ethyl-β-naphthyl,
3-ethyl-β-naphthyl,
4-ethyl-β-naphthyl,
5-ethyl-β-naphthyl,
6-ethyl-β-naphthyl,
7-ethyl-β-naphthyl,
8-ethyl-β-naphthyl,
2,3-dipropyl-α-naphthyl,
5,8-diisopropyl-β-naphthyl and the like.

The organic radical, X, obtained by removing a terminal hydrogen atom from a basically substituted phenol or oxime in the above formula, may be obtained from any suitable corresponding phenol or oxime, especially those which contain tertiary nitrogen atoms.

The term basically substituted phenol includes all organic compounds having an hydroxyl group bonded to an aromatic radical, such as, for example, the aromatic hydroxy compounds obtained by adding an hydroxyl group at the free valence of the above named aromatic radicals, and containing tertiary nitrogen atoms, such as, for example, dialkylaminophenols, such as, for example, p-N,N-dimethyl-amino-phenol, m-N,N-dimethyl-amino - phenol, p-N,N-diethyl-amino-phenol, p-N-methyl-N-ethyl-amino-phenol and the like; and peralkylated benzylamino phenols such as p-(dimethyl-amino methyl) phenol, 2,4,6-tris-(dimethylaminoethyl)-phenol and the like.

The term basically substituted oxime includes all organic compounds containing the monovalent radical —CH=N—OH, and tertiary nitrogen atom. Generally, these oximes may be considered to be derivatives of tertiary-amino-oxo-compounds which partially are obtainable, e.g., from aldehydes or ketones, formaldehyde and dialkyl-amines by the so-called Mannich reaction. As examples there my be mentioned 1-dimethylamino-pentanone-4,
1-diethylamino-pentanone-4,
1-dimethylamino-2-methyl-butanone-3,
1-diethylamino-2-methyl-butanone-3,
2,2-bis-(dimethylaminomethyl)-butanone-3,
p-dimethylamino-benzaldehyde,
p-diethylamino-benzaldehyde,
β-dimethylamino-acetaldehyde,
pyridine-aldehyde, etc.

Some of these compounds which are partially new are described, e.g., in copending U.S. patent application Serial No. 1870.

They may be prepared, e.g., by the reaction of tin-alkoxy compounds of the following formula

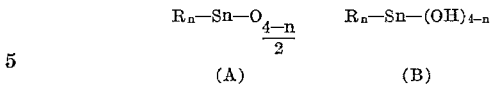

(A)      (B)

or organic tin-hydroxydes of the general Formula B with corresponding oximes or phenols, whereby according to the two last mentioned reactions the water has be removed, e.g., by azeotropical distillation.

Still another way consists in reacting suitable organic tin-halides of the formula

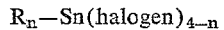

with suitable salts of suitable oximes or phenols.

The biocidal activity of the compounds of this invention is very remarkable. The compounds are active against a great variety of parasitical and saprophytical fungi yeasts and bacteria. The compounds furthermore are relatively nontoxic against warm blooded animals and they have also a very remarkable nontoxicity on green plants. For the last reasons they also may be used for the combating of plant diseases on green plants. The compounds furthermore may be used as seed dressing agents, agents for soil treatment, for the conservation of banana fruit stems, and at least also for the preparation of leather and synthetic resins against attack by fungi and bacteria.

Very remarkable is the activity against phytopathogenic fusarium fungi. These pests, since living in the soil cannot be combated with many economical fungicides, without a refraining period between soil treatment and sowing. They can be combated with the inventively used compounds effectively, because no waiting period has to be maintained.

The inventively used compounds may be used as such but also in combination with any substituted solid or liquid carriers or diluents together, if necessary, with auxiliary solvents such as commercial emulsifiers, and the like. They furthermore may be used in combination with other plant protecting agents, preservatives, fertilizers, agents for improvement of the structure of the soil and the like.

The following examples may be griven to illustrate the present invention:

*Example 1*

14 parts by weight of triisopropyl-methoxy tin (B.P.$_{1.2}$ 66° C., $n_D^{20}$ 1.4773), prepared from triisopropyl tin chloride and about stoichiometric amounts of sodium methylate are reacted with 13.3 parts by weight of 2,4,6-tris-(dimethylamine methyl) phenol for 5 hours at 110° C., 12 mm. Hg. There are obtained 26.6 parts by weight of a brownish viscous oil $n_D^{20}$ 1.5052 of the following formula

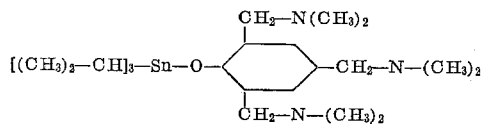

The fungicidal activity of this compound has been demonstrated on 10 various phytopathogenic fungi and generally has been proven satisfactorily. For practical purposes this compound is especially useful as a soil treating agent in a concentration of about 25–100 p.p.m. Plant diseases caused by Fusarium, Rhizoctonia, Phythium and Sclerotium are especially effectively prevented.

*Example 2*

27.9 parts by weight of the triisopropyl-methoxy-tin as described in Example 1 are reacted with 17.2 parts by weight of N,N-diethylamino - 5 - pentanone-2-oxime ($n_D^{20}$=1.4720, B.P.$_{0.1}$ 100–108° C.) in a manner as described in Example 1. There are obtained 43 parts by weight of a viscous reaction product ($n_D^{20}=1.4804$), of the following formula

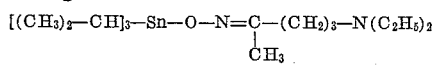

The fungicidal activity of this compound has been demonstrated on 10 various phytopathogenic fungi and generally has been proven satisfactorily. For practical purposes this compound is especially useful as a soil treating agent in a concentration of about 25–100 p.p.m. Plant diseases caused by Fusarium, Rhizoctonia, Sclerotium and Thielaviopsis are especially effectively prevented.

Example 3

By reaction of 12 parts by weight of diethyl-dimethoxy-tin with 17.2 parts by weight of the oxime as described in Example 2 there are obtained 26.5 parts by weight of a diethyl tin-dioxime ($n_D^{20}=1.4910$) in liquid form of the following formula

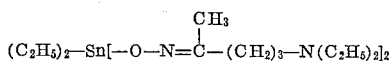

This compound, too, shows a satisfactory fungicidal activity and plant diseases caused by Fusarium are especially effectively prevented, when the compound is applied as a soil treating agent.

Example 4

48 parts by weight of tributyl-methoxy-tin and 21.6 parts by weight of 1-dimethylamino-2-methyl-butanone-3-oxime ($n_D^{20}=1.4679$, B.P.$_{0.1}$ 71–73° C.) are reacted under dry atmosphere at 130° C./12 mm. Hg for 4 hours. There are obtained 66 parts by weight of the tributyl-tin-oxime ($n_D^{20}=1.4778$) of the following formula

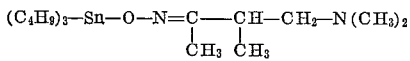

The fungicidal activity of this compound has been proven satisfactory. For practical purposes this compound is especially useful as a soil treating agent. Plant diseases caused by Rhizoctonia and Fusarium are especially effectively prevented.

Example 5

30.7 parts by weight of tributyl-tin-hydroxide and 26.5 parts by weight of 2,4,6 - tris - (dimethylaminomethyl)-phenol are reacted with 150 ml. of toluene. There are obtained 60 parts by weight of the basic tributyl-tin-phenol ($n_D^{20}=1.5028$) after recrystallization of the solvent in vacuum. The compound has the following formula

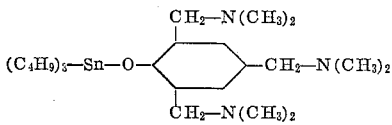

The fungicidal activity of this compound generally has been proven satisfactory. Plant diseases especially at banana fruit stems caused by *Thielaviopsis paradoxa* and *Fusarium musarum* are effectively prevented.

Example 6

70 parts by weight of triethyl-methoxy-tin and 79.5 parts by weight of 2,4,6 - tris - (dimethylamino-methyl)-phenol are reacted at 130° C./12 mm. Hg. There is obtained in a quantitative yield the triethyl-tin-phenolate as a yellowish liquor ($n_D^{20}=1.5208$) of the following formula

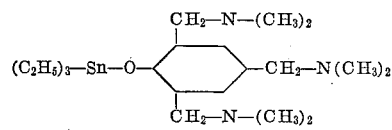

This compound is especially useful for the treatment of leather and it shows a large protection against water and is stable under tropical conditions at the attack of fungi.

Example 7

29.5 parts by weight of dibutyldimethoxy-tin and 28.8 parts by weight of 1-dimethylamino-pentanone-4-oxime (B.P.$_{0.1}$ 71–80° C., $n_D^{20}=1.4703$) are reacted in vacuum in a usual manner at 130° C. There are obtained 54 parts by weight of the reaction product ($n_D^{20}=1.4902$) of the following formula

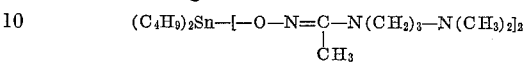

The fungicidal activity of the compound has been proven generally satisfactory. A sealing paste or solution containing the active compound in 1–10% concentrations and applied at bananas it shows good protection against stem infestation. For practical purposes this compound is especially useful as a soil treating agent in a concentration of 10 p.p.m. Plant diseases caused by *Rhizoctonia solani* are especially effectively prevented.

Example 8

30.7 parts by weight of tributyl-tin-hydroxide and 15.1 parts by weight of 2-dimethylamino-phenol are reacted aceotropically with 100 ml. of toluene. After separation from water the solution is filtered and concentrated. Thereby are obtained 46 parts by weight of the alkyl-tin-phenolate as a viscous liquor ($n_D^{20}=1.5098$) of the following formula

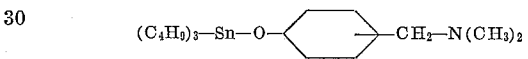

The fungicidal activity of the compound has generally been proven satisfactory. For practical purposes this compound is especially useful as a soil treating agent. Plant diseases caused by Rhizoctonia are especially effectively prevented.

Example 9

12 parts by weight of triethylmethoxy-tin and 9.6 parts by weight of p-diethylamino-benzaldehyde-oxime are reacted at 130° C. in vacuum. Thereby are obtained 20.5 parts by weight of a viscous product ($n_D^{20}=1.5875$) of the following formula

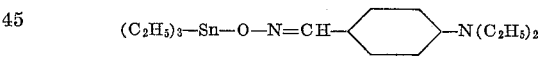

The fungicidal activity of this compound has been demonstrated on various phytopathogenic fungi and generally has been proven satisfactory. For practical purposes this compound is especially useful as a soil treating agent.

Example 10

6.1 parts by weight each of pyridine-2-aldoxime (M.P. 114–115° C.), pyridine-3-aldoxime (M.P. 146–146.5° C.), pyridine-4-aldoxime (M.P. 130–131° C.) and 12.0 parts by weight of triethyl-methoxy-tin are reacted in the usual manner at 130° C./12 mm. Hg for 4 hours. There are obtained 16.5 parts by weight of the reaction product triethyl-tin-pyridaldoxime (2-isomer $n_D^{20}=1.5618$; 3-isomer $n_D^{20}=1.5860$; 4-isomer $n_D^{20}=1.6068$) of the following formula

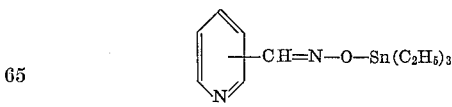

The fungicidal activity of the compound has generally been proven satisfactory and has been demonstrated on various phytopathogenic fungi.

Example 11

18.0 parts by weight of triamyl-methoxy-tin ($n_D^{20}=1.4740$ B.P.$_{0.1}$ 120–125° C.) and 8.2 parts by weight of p-dimethylamino-benzaldehyde-oxime are reacted at 130° C./12 mm. Hg for 5 hours. There are obtained 25 parts by weight of basic oxime ($n_D^{20}=1.5478$) of the following formula

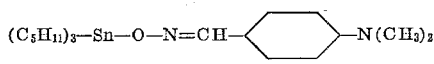

The fungicidal activity of this compound has been generally proven satisfactory. For practical purposes this compound is especially useful as a soil treating agent in a concentration of about 25–100 p.p.m. Plant diseases caused by Rhizoctonia are especially effectively prevented.

*Example 12*

16 parts by weight of tributyl-methoxy-tin and 9.6 parts by weight of p-diethylamino-benzaldehyde-oxime are reacted at 130° C./12 mm. Hg. There are obtained 24 parts by weight of tributyl-tin-oxime ($n_D^{20}=1.5573$) of the following formula

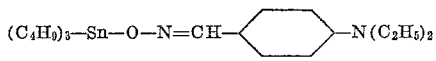

The fungicidal activity of this compound has been demonstrated on various phytopathogenic fungi and generally has been proven satisfactory. For practical purposes this compound is especially useful as a soil treating agent.

We claim:

1. A method of combating fungus and bacterial infections which comprises treating an object to be protected with an effective amount of a compound of the formula

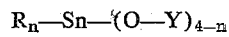

wherein R is a member selected from the group consisting of alkyl, alkenyl, benzyl, α-phenylalkyl, β-phenylalkyl, γ-phenylalkyl, α'-naphthylalkyl, β'-naphthylalkyl, alkyl-substituted phenanthrylene, alkyl-substituted fluorenyl, alkyl-substituted acenaphthene, alkyl-substituted chrysene, alkyl-substituted pyrene, alkyl-substituted triphenylene, alkyl-substituted naphthacene, cycloalkyl, alkyl-substituted α-cycloalkyl, alkyl-substituted β-cycloalkyl, alkyl-substituted γ-cycloalkyl, α-phenylalkenyl, β-phenylalkenyl, α-naphthyl-alkenyl, β-naphthylalkenyl, alkenyl substituted phenanthrene, alkenyl-substituted fluorene, alkenyl-substituted acenaphthene, alkenyl-substituted chrysene, alkenyl substituted pyrene, alkenyl substituted triphenylene, alkenyl substituted naphthacene, alkenyl substituted α-cycloalkyl, alkenyl-substituted β-cycloalkyl, alkenyl-substituted γ-cycloalkyl, di-lower-alkyl phenyl; Y is dialkyl amino substituted phenol and n is an integer within the range of 1–3.

2. Method of combating fungi and bacteria which comprises treating an object to be protected with an effective amount of a tin compound of the forumula

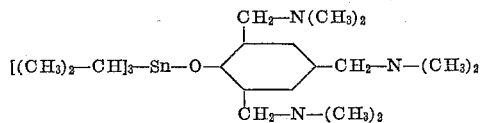

3. Method of combating fungi and bacteria which comprises treating an object to be protected with an effective amount of a tin compound of the formula

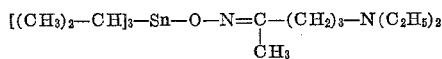

4. Method of combating fungi and bacteria which comprises treating an object to be protected with an effective amount of a tin compound of the formula

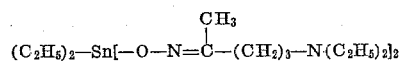

5. Method of combating fungi and bacteria which comprises treating an object to be protected with an effective amount of a tin compound of the formula

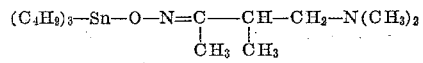

6. Method of combating fungi and bacteria which comprises treating an object to be protected with an effective amount of a tin compound of the formula

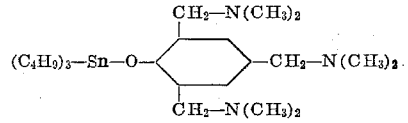

7. Method of combating fungi and bacteria which comprises treating an object to be protected with an effective amount of a tin compound of the formula

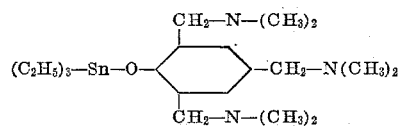

8. Method of combating fungi and bacteria which comprises treating an object to be protected with an effective amount of a tin compound of the formula

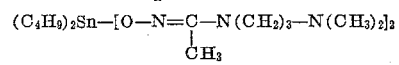

9. Method of combating fungi and bacteria which comprises treating an object to be protected with an effective amount of a tin compound of the formula

10. Method of combating fungi and bacteria which comprises treating an object to be protected with an effective amount of a tin compound of the formula

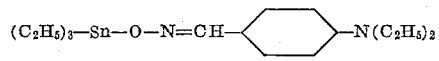

11. Method of combating fungi and bacteria which comprises treating an object to be protected with an effective amount of a tin compound of the formula

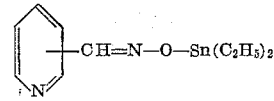

12. Method of combating fungi and bacteria which comprises treating an object to be protected with an effective amount of a tin compound of the formula

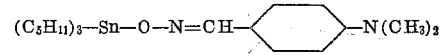

13. Method of combating fungi and bacteria which comprises treating an object to be protected with an effective amount of a tin compound of the formula

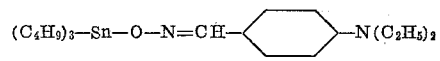

References Cited by the Examiner

UNITED STATES PATENTS 3,097,999  7/63  Koopmans _____ 167—22

FOREIGN PATENTS 544,280    1/56  Belgium.
1,102,418  5/55  France.
1,061,561  7/59  Germany.
797,073    6/58  Great Britain.
835,546    5/60  Great Britain.

JULIAN S. LEVITT, *Primary Examiner.*

MORRIS O. WOLK, LEWIS GOTTS, *Examiners.*